(12) United States Patent
Jiang (10) Patent No.: US 8,358,733 B2
(45) Date of Patent: Jan. 22, 2013

(54) HELICALLY FLUTED TUBULAR FUEL ROD SUPPORT

(75) Inventor: Xiaoyan (Jane) Jiang, Columbia, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 467 days.

(21) Appl. No.: 12/538,307

(22) Filed: Aug. 10, 2009

(65) Prior Publication Data

US 2011/0033020 A1     Feb. 10, 2011

(51) Int. Cl.
*G21C 3/34* (2006.01)
*G21C 3/32* (2006.01)

(52) U.S. Cl. ........ 376/442; 376/438; 376/462; 376/441; 376/446

(58) Field of Classification Search .................. 376/438, 376/462, 441, 442, 446
See application file for complete search history.

(56) References Cited

U.S. PATENT DOCUMENTS

| | | |
|---|---|---|
| 3,933,584 A | 1/1976 | Litt |
| 4,061,536 A | 12/1977 | Creagan et al. |
| 4,508,679 A | 4/1985 | Matzner et al. |
| 4,585,615 A | 4/1986 | DeMario |
| 4,692,302 A | 9/1987 | DeMario et al. |
| 4,726,926 A | 2/1988 | Patterson et al. |
| 4,740,351 A | 4/1988 | Katsumizu et al. |
| 4,756,878 A | 7/1988 | King et al. |
| 5,084,237 A | 1/1992 | Patterson et al. |
| 5,112,571 A | 5/1992 | Orii et al. |
| 5,186,891 A | 2/1993 | Johansson et al. |
| 5,440,599 A | 8/1995 | Rodack et al. |
| 5,490,192 A | 2/1996 | Nakajima et al. |
| 5,526,387 A | 6/1996 | Johansson et al. |
| 5,566,217 A | 10/1996 | Croteau et al. |
| 5,666,389 A | 9/1997 | Andersson et al. |
| 5,675,621 A | 10/1997 | Croteau et al. |
| 5,778,035 A | 7/1998 | Nylund |
| 5,815,545 A | 9/1998 | Johansson |
| 5,862,196 A | 1/1999 | Wolfram |
| 6,130,927 A | 10/2000 | Kang et al. |
| 6,236,702 B1 | 5/2001 | Chun et al. |
| 6,526,116 B1 | 2/2003 | Nguyen et al. |
| 6,606,369 B1 | 8/2003 | Smith, III et al. |
| 6,728,329 B2 | 4/2004 | Hirano et al. |
| 6,888,911 B2 | 5/2005 | Stabel-Weinheimer et al. |

FOREIGN PATENT DOCUMENTS

FR          2531258          2/1984

OTHER PUBLICATIONS

Merriam-Webgster's Collegiate Dictionary, Tenth Edition (1999), Merriam-Webster, Inc., Springfield, MA, USA, Ed. F.C. Mish; in particular: p. 485.

*Primary Examiner* — Erin M Leach (57) ABSTRACT

A support grid for a nuclear fuel assembly, the fuel rod assembly having a generally cylindrical fuel rod with a diameter, wherein the support grid includes a frame assembly having a plurality of outer straps and a plurality of helical frame members. The helical frame members have a contact portion structured to contact an adjacent helical frame member and at least one helical fuel rod contact portion with a lesser diameter. The lesser diameter is generally equivalent to the fuel rod diameter such that a fuel rod disposed in the helical frame member would engage the inner helical frame member at helical fuel rod contact portion. The helical frame members are coupled to each other at the contact portions thereby forming a grid. The plurality of outer straps are disposed about the perimeter of the helical frame members.

16 Claims, 11 Drawing Sheets

FIG. 1

PRIOR ART

HELICALLY FLUTED TUBULAR FUEL ROD SUPPORT

CROSS REFERENCE TO RELATED APPLICATION

This application claims priority under 35 U.S.C. §119(e) to U.S. Traditional patent application Ser. No. 11/033,434, filed Jan. 11, 2005 entitled, HELICALLY FLUTED TUBULAR FUEL ROD SUPPORT.

BACKGROUND OF THE INVENTION

1. Field of the Invention

The present invention relates to nuclear reactor fuel assemblies and more particularly to an array for supporting fuel rods wherein the array, or support assembly, consists of a matrix of substantially flat members forming a grid-like frame assembly and a plurality of helically fluted tubular members.

2. Background Information

In a typical pressurized water reactor (PWR), the reactor core is comprised of a large number of generally vertically, elongated fuel assemblies. The fuel assemblies include a support grid structured to support a plurality of fuel rods. The fuel assembly includes a top nozzle, a bottom nozzle, a plurality of the support grids and intermediate flow mixing grids, and a plurality of thimble tubes. The support grids are attached to the plurality of elongated thimble tubes which extend vertically between the top and bottom nozzles. The thimble tubes typically receive control rods, plugging devices, or instrumentation therein. A fuel rod includes a nuclear fuel typically clad in a cylindrical metal tube. Generally, water enters the fuel assembly through the bottom nozzle and passes vertically upward through the fuel assembly. As the water passes over the fuel rods, the water is heated until the water exits the top nozzle at a very elevated temperature.

The support grids are used to position the fuel rods in the reactor core, resist fuel rod vibration, provide lateral support for the fuel rods and, to some extent, vertically restrain the fuel rods against longitudinal movement. One type of conventional support grid design includes a plurality of interleaved straps that together form an egg-crate configuration having a plurality of roughly square cells which individually accept the fuel rods therein. Depending upon the configuration of the thimble tubes, the thimble tubes can either be received in cells that are sized the same as those that receive fuel rods therein, or can be received in relatively larger thimble cells defined in the interleaved straps.

The straps are generally flat, elongated members having a plurality of relatively compliant springs and relatively rigid dimples extending perpendicularly from either side of the flat member. Slots in the straps are utilized to effect an interlocking engagement with adjacent straps, thereby creating a grid of "vertical" and "horizontal" straps which form generally square cells. The location of the springs and dimples are configured such that each cell typically has a spring on each of two adjacent sides. On each of the sides of the cell opposite the springs there are, typically, two dimples. The springs must be disposed opposite the dimples so that the fuel rod is biased against the dimples by the springs. The springs and dimples of each cell engage the respective fuel rod extending through the cell thereby supporting the fuel rod at six points (two springs and four dimples) in each cell. Preferably, each spring and/or dimple includes an arcuate, concave platform having a radius generally the same as a fuel rod. This concave platform helps distribute the radial load on the sides of the fuel rods. The perimeter straps have either springs or dimples extending from one side and peripherally enclose the inner straps of the grid to impart strength and rigidity to the grid. During assembly, the straps must be assembled in a specific configuration to ensure that each cell has the springs and dimples in the proper position. As such, assembly of the prior art frame assembly is a time consuming process. It would be advantageous to have a support assembly that is more easily constructed.

The straps may include one or more mixing vanes formed thereon that facilitate mixing of the water within the reactor to promote convective heat exchange between the fuel rods and the water. This motion, along with the elevated temperatures, pressures, and other fluid velocities within the reactor core tend to cause vibrations between the grids and the fuel rods. As with the proper positioning of the straps, care must be used to ensure that the mixing vanes are disposed at the proper locations. Additionally, the action of the water flow impinging on the mixing vanes cause both a pressure drop in the pressure vessel and creates torque in the frame assembly, neither of which are desired.

Since the grids support the fuel rods within the fuel cell, such vibrations therebetween can result in fretting of the fuel rods. Such fretting, if sufficiently severe, can result in breach of the fuel rod cladding with resultant nuclear contamination of the water within the reactor.

It is desired to provide an improved grid designed to minimize fretting wear between the grids and the fuel rods while maintaining a mixed flow of water through the reactor core. It is also desired to have a support assembly that is easily assembled.

There is, therefore, a need to provide a support grid for a nuclear fuel assembly wherein the fuel rods are supported by a tubular member having a helical, fluted fuel rod contact portion.

There is a further need for a support assembly that is easily assembled.

There is a further need for a nuclear fuel assembly wherein a support grid includes a tubular member having a helical, fluted fuel rod contact portion for supporting fuel rods.

SUMMARY OF THE INVENTION

These needs, and others, are met by the present invention which provides a support grid for a nuclear fuel assembly, wherein the fuel rod is a generally cylindrical fuel rod with a diameter, and the support grid includes a frame assembly having a plurality of generally uniform cells, each cell having at least one sidewall and a width, and at least one generally cylindrical tubular member. The tubular member has a cell contact portion with a greater diameter and at least one fluted helical fuel rod contact portion with a lesser diameter. As used herein, a "fuel rod contact portion" is typically, but is not limited to, an arcuate line extending at least partly around the cylinder that is a fuel rod. The cell contact portion and the fuel rod contact portion are joined by a transition portion. The greater diameter is generally equivalent to the cell width, and the lesser diameter is generally equivalent to the fuel rod diameter. In this configuration, a fuel rod disposed in the tubular member would engage the inner diameter. The tubular member is disposed in one cell of the plurality of generally square cells so that the cell contact portion engages the at least one cell sidewall. In this manner, the fuel rod is held by the helical fuel rod contact portion and the tubular member is held by the frame assembly.

In a preferred embodiment, the tubular member has a wall of uniform thickness so that the helical fuel rod contact portion defines a passage with a helical shape on both the side adjacent to the fuel rod and the side adjacent to the cell wall.

These helical shaped passages act to mix the water so that mixing vanes are not required. There are at least two advantages to using the helical shaped passages; first, the water flow does not impinge on the shaped passage, so there is a minimal pressure drop created by the mixing structure. Second, by reversing the direction of the helical passage in selected cells, the amount of torque exerted on the frame assembly may be controlled.

The helical fuel rod contact portion may be formed in various configurations. For example, there may be a single (or multiple) helical fuel rod contact portion having an angular displacement of 360 degrees, that is, extending 360 degrees around the tubular member. However, given the relatively short height of a typical cell, the pitch (radial distance/height) of the helical fuel rod contact portion may be too great thereby restricting the flow of water through the helical portion of the passage. Alternatively, there may be at least two helical fuel rod contact portions each extending 180 degrees around the tubular member. However, in a preferred embodiment, there are four helical fuel rod contact portions each extending 90 degrees around the tubular member. While these examples have used a number (N) of helical fuel rod contact portions and an angular displacement (A) that equals 360 (N*A=360), this is not required. That is, virtually any number of helical fuel rod contact portion(s) may be used with any angular displacement. It is further noted that, while a symmetrical helical contact portion is preferred, a helical contact portion may be an asymmetrical helix; that is the pitch may be variable along the tubular member.

The tubular members, preferably, have a smooth transition between the cell contact portion and the helical fuel rod contact portion. Where there are four helical fuel rod contact portions, the shape of the tubular member is similar to the perimeter of a flower with four petals. Alternatively, the tubular member may include extended platform sections structured to engage either the wall of the frame assembly and/or the fuel rod. Where there is a platform, the transition section will typically be a sharp curve. In another embodiment, the greater portion of the length of the transition portion is generally flat and the ends are sharply angled.

The frame assembly includes a plurality of cells typically structured to contain a nuclear fuel rod. As noted above, some cells are adapted to enclose a thimble rod or other device. However, the non-fuel rod cells are not relevant to this invention and, while noted, will not be discussed hereinafter. In the preferred embodiment, the frame assembly is made from a plurality of substantially flat, elongated strap members disposed in two interlocked sets, a "vertical" set and a "horizontal" set. The vertical set of strap members is disposed generally perpendicular to the horizontal strap members. Also, the strap members in each set are generally evenly spaced. In this configuration, the cells are generally square. In an alternate embodiment, the frame assembly is made from tubular members that have been welded together, preferably at 90 degree intervals.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

As used herein, directional terms, such as, but not limited to, "upper" and "lower" relate to the components as shown in the Figures and are not limiting upon the claims.

Figure 1:
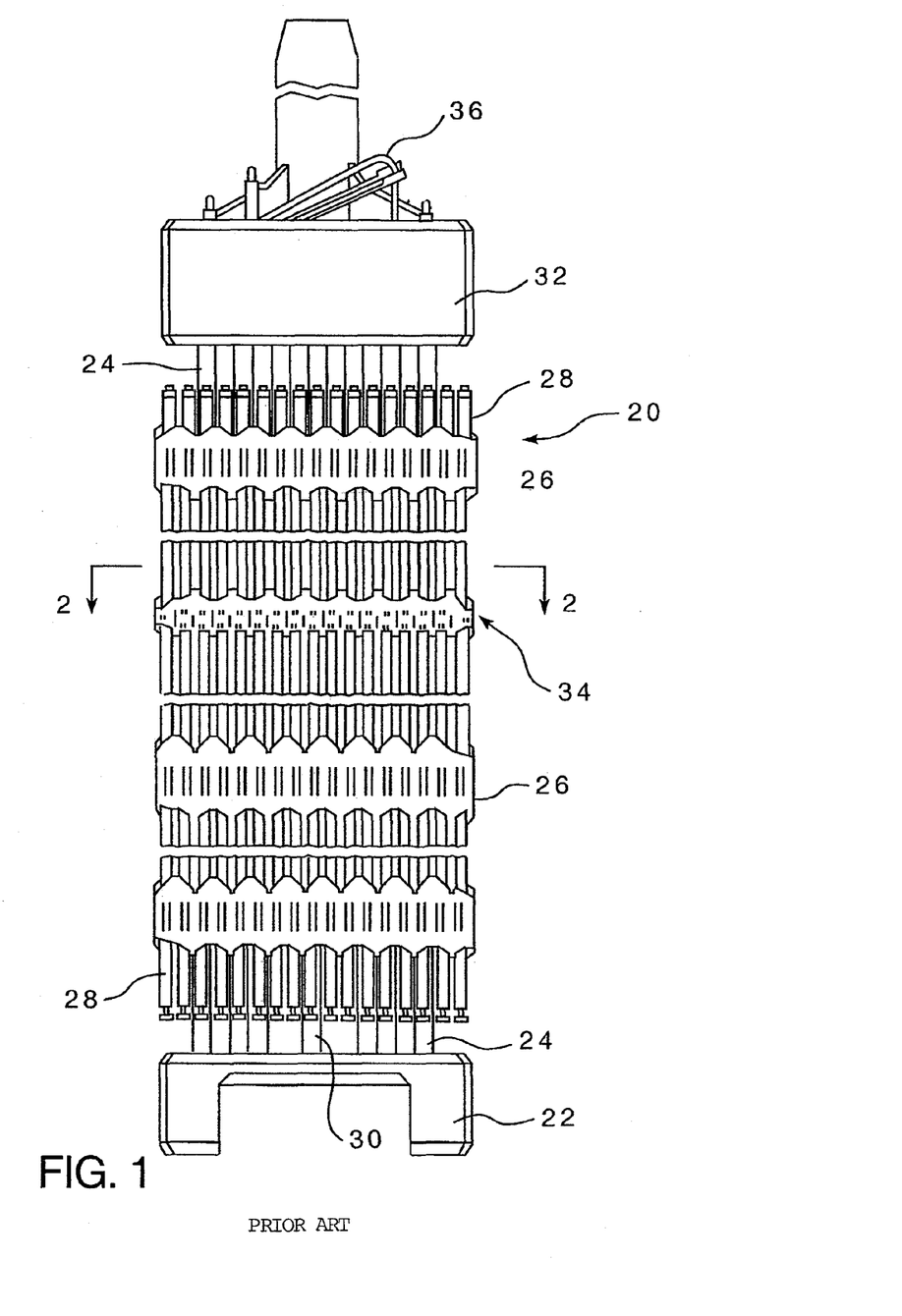
FIG. 1 is an elevational view of a conventional nuclear fuel assembly.

As shown in FIG. 1, there is a fuel assembly 20 for a nuclear reactor. The fuel assembly 20 is disposed in a water vessel (not shown) having an inlet at the bottom and an outlet at the top. The fuel assembly 20 comprises a lower end structure or bottom nozzle 22 for supporting the fuel assembly 20 on the lower core plate (not shown) in the core region of a reactor (not shown); a number of longitudinally extending control rod guide tubes, or thimbles 24, projecting upwardly from the bottom nozzle 22; a plurality of transverse support grids 26 axially spaced along the guide thimbles 24; an organized array of elongated fuel rods 28 transversely spaced and supported by the grids 26; an instrumentation tube 30 located in the center of the assembly; and an upper end structure or top nozzle 32 attached to the upper ends of the guide thimbles 24, in a conventional manner, to form an integral assembly capable of being conventionally handled without damaging the assembly components. The bottom nozzle 22 and the top nozzle 32 have end plates (not shown) with flow openings (not shown) for the upward longitudinal flow of a fluid coolant, such as water, to pass up and along the various fuel rods 28 to receive the thermal energy therefrom. To promote mixing of the coolant among the fuel rods 28, a mixing vane grid structure, generally designated by the numeral 34, is disposed between a pair of support grids 26 and mounted on the guide thimbles 24.

The top nozzle 32 includes a transversely extending adapter plate (not shown) having upstanding sidewalls secured to the peripheral edges thereof in defining an enclosure or housing. An annular flange (not shown) is secured to the top of the sidewalls. Suitably clamped to this flange are leaf springs 36 (only one of which being shown in FIG. 1) which cooperate with the upper core plate (not shown) in a conventional manner to prevent hydraulic lifting of the fuel assembly caused by upward coolant flow while allowing for changes in fuel assembly length due to core induced thermal expansion and the like. Disposed within the opening defined by the sidewalls of the top nozzle 32 is a conventional rod cluster control assembly 38 having radially extending flukes, being connected to the upper end of the control rods, for vertically moving the control rods in the control rod guide thimbles 24 in a well known manner. To form the fuel assembly 20, support grids 26 and a mixing vane grid structure 34 are attached to the longitudinally extending guide thimbles 24 at predetermined axially spaced locations. The bottom nozzle 22 is suitably attached to the lower ends of the guide thimbles 24 and then the top nozzle 32 is attached to the upper ends of guide thimbles 24. Fuel rods 28 are then inserted through the grids 26 and grid structure 34. The fuel rods 28 are generally elongated cylinders having a diameter. For a more detailed description of the fuel assembly 20, reference should be made to U.S. Pat. No. 4,061,536.

The fuel assembly 20 depicted in the drawings is of the type having a square array of fuel rods 28 with the control rod guide thimbles 24 being strategically arranged within the fuel rod array. Further, the bottom nozzle 22, the top nozzle 32, and likewise the support grids 26 are generally square in cross section. In that the specific fuel assembly 20 represented in the drawings is for illustrational purposes only, it is to be understood that neither the shape of the nozzles or the grids, or the number and configuration of the fuel rods 28 and guide thimbles 24 are to be limiting, and the invention is equally applicable to different shapes, configurations, and arrangements than the ones specifically shown.

Figure 2:
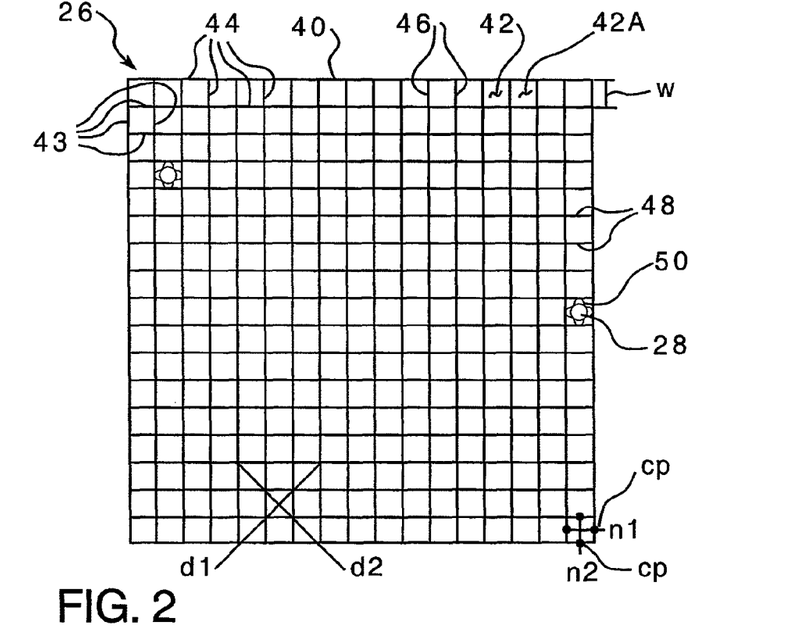
FIG. 2 is a top view of a frame assembly showing the "vertical" and "horizontal" straps.
Figure 3:
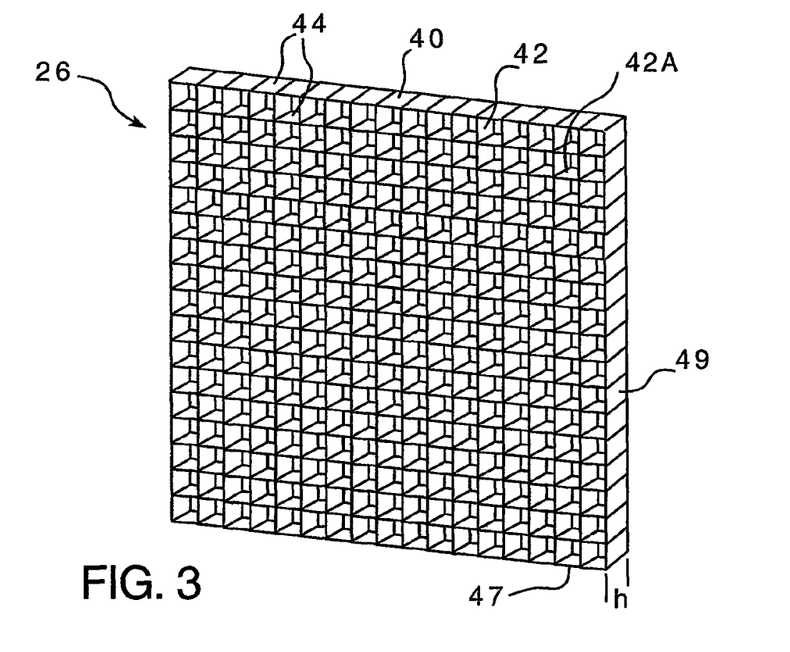
FIG. 3 is an isometric view of a frame assembly.
Figure 4:
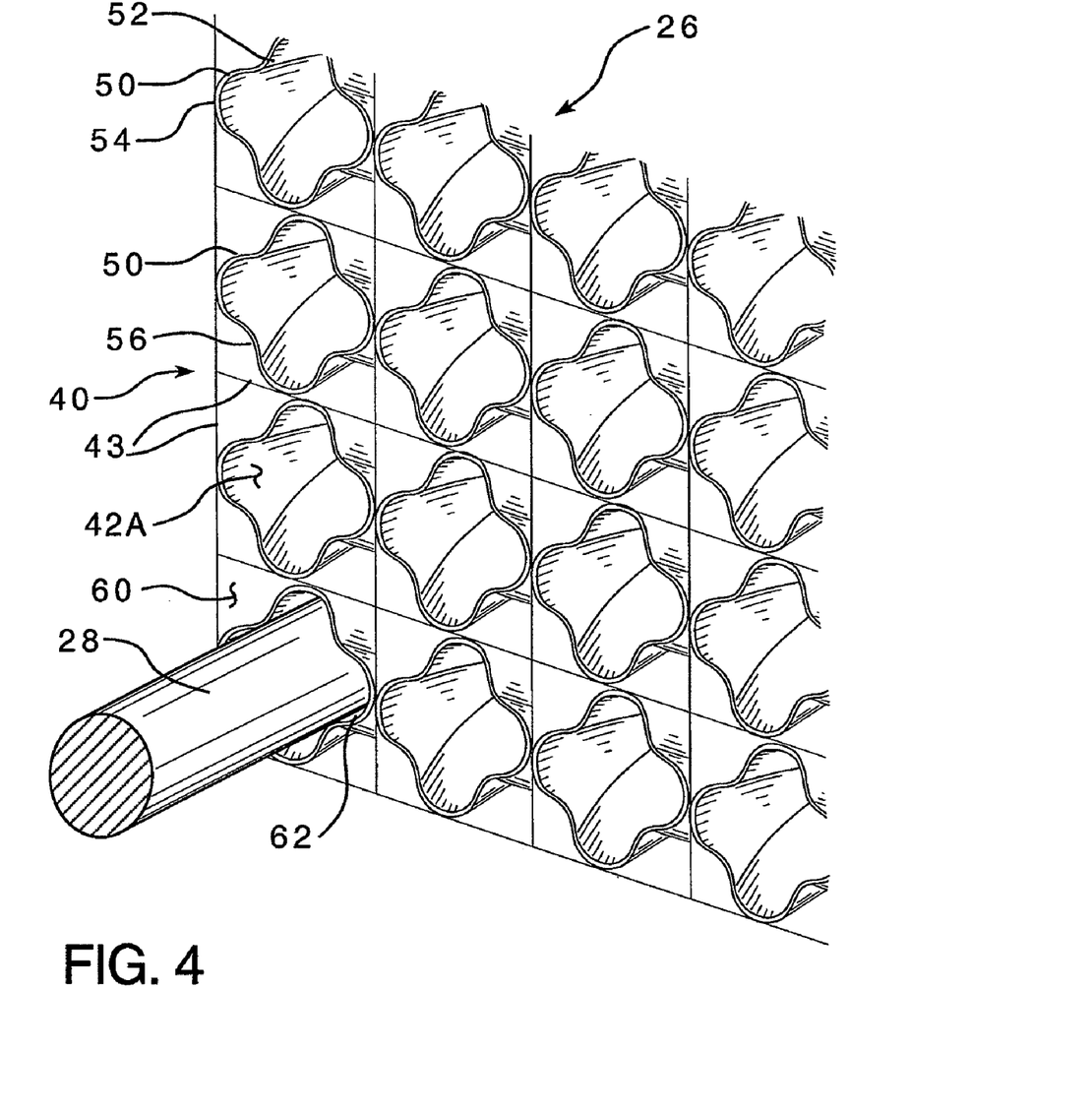
FIG. 4 is a detailed view of a support grid.

For example, as shown in FIGS. 2 and 4, the support grid 26 includes a frame assembly 40 and at least one generally cylindrical tubular member 50. The frame assembly 40 includes a plurality of cells 42 defined by cell walls 43. Each cell 42 has a width as indicated by the letter "w." In one embodiment, the cells 42 and cell walls 43 are formed from a plurality of substantially flat, elongated strap members 44 disposed in two interlocked sets, a vertical set 46 and a horizontal set 48. The strap members 44 in the vertical and horizontal sets 48 of strap members 44 are generally perpendicular to each other. Additionally, the strap members 44 in each set are generally evenly spaced. In this configuration, the strap members 44 form generally square cells 42A. Thus, each cell 42A has two diagonal axes "d1" and "d2," which are perpendicular to each other and extend through the corners of the cell 42A, as well as two normal axes "n1" and "n2," which are perpendicular to each other and extend through the center of the cell 42A and which intersect perpendicularly with the cell walls 43. The points on the cell wall 43 that the two normal axes pass through are the closest point, "cp," between the cell wall 43 and the center of the cell 42. As shown in FIG. 3, the frame assembly 40 also has a height, indicated by the letter "h," wherein the height is substantially less than the width or length of the frame assembly 40. Further, the frame assembly 40 has a top side 47 and a bottom side 49. It is notable that the strap members 44 of the present invention do not include protuberances, such as springs and dimples, as did strap members of the prior art. The lack of additional support structures make the construction of the frame assembly 40 very easy.

Figure 5:
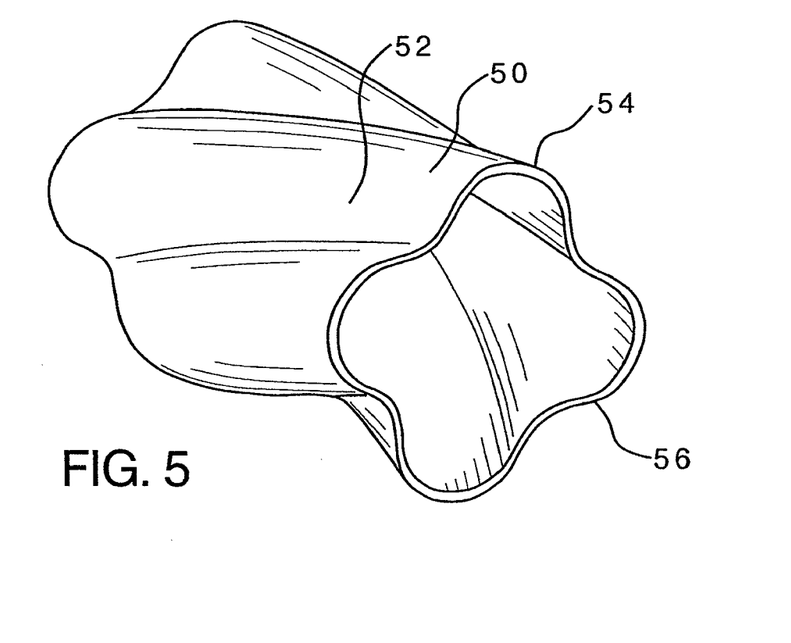
FIG. 5 is an isometric view of a tubular element with four fuel rod contact portions.
Figure 6:
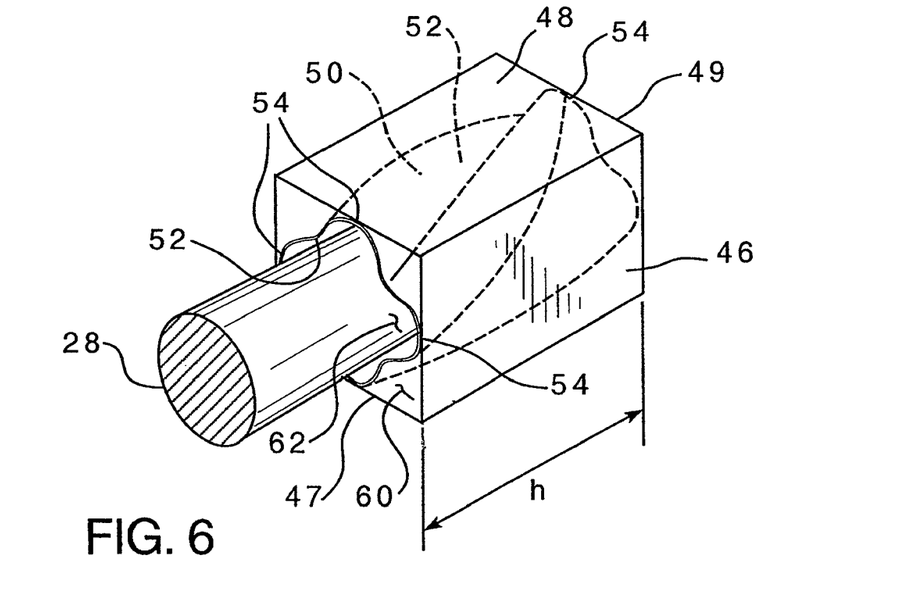
FIG. 6 is an isometric view of a tubular element with four fuel rod contact portions disposed in a cell with a fuel rod.

The tubular member 50 of the support grid 26 is shown in FIGS. 4 and 5. The tubular member 50 includes at least one helical fluted portion or fuel rod contact portion 52, a cell contact portion 54, and a transition portion 56 disposed therebetween. As shown in FIGS. 4-6, the tubular member 50 has four fuel rod contact portions 52, which is the preferred embodiment. Other configurations are discussed below. The cell contact portion 54 has a greater diameter being generally equivalent to said cell width and is structured to snugly engage the cell 42. The fuel rod contact portion 52 has a lesser diameter, being generally equivalent to said fuel rod 28 diameter. Thus, the tubular member 50 may be disposed in a cell 42 and a fuel rod 28 may be disposed in the tubular member 50. In a preferred embodiment, the tubular member 50 is made from a material having a uniform thickness. Thus, the helical fuel rod contact portion 52 defines an outer passage 60 between the outer side of the tubular member 50 and the cell wall 43. Additionally, the cell contact portion 54, which is spaced from the fuel rod 28, defines an inner passage 62. Water which flows through either the outer or inner passages 60, 62 is influenced by the shape of the helical fuel rod contact portion 52 resulting in the water being mixed.

Figure 7:
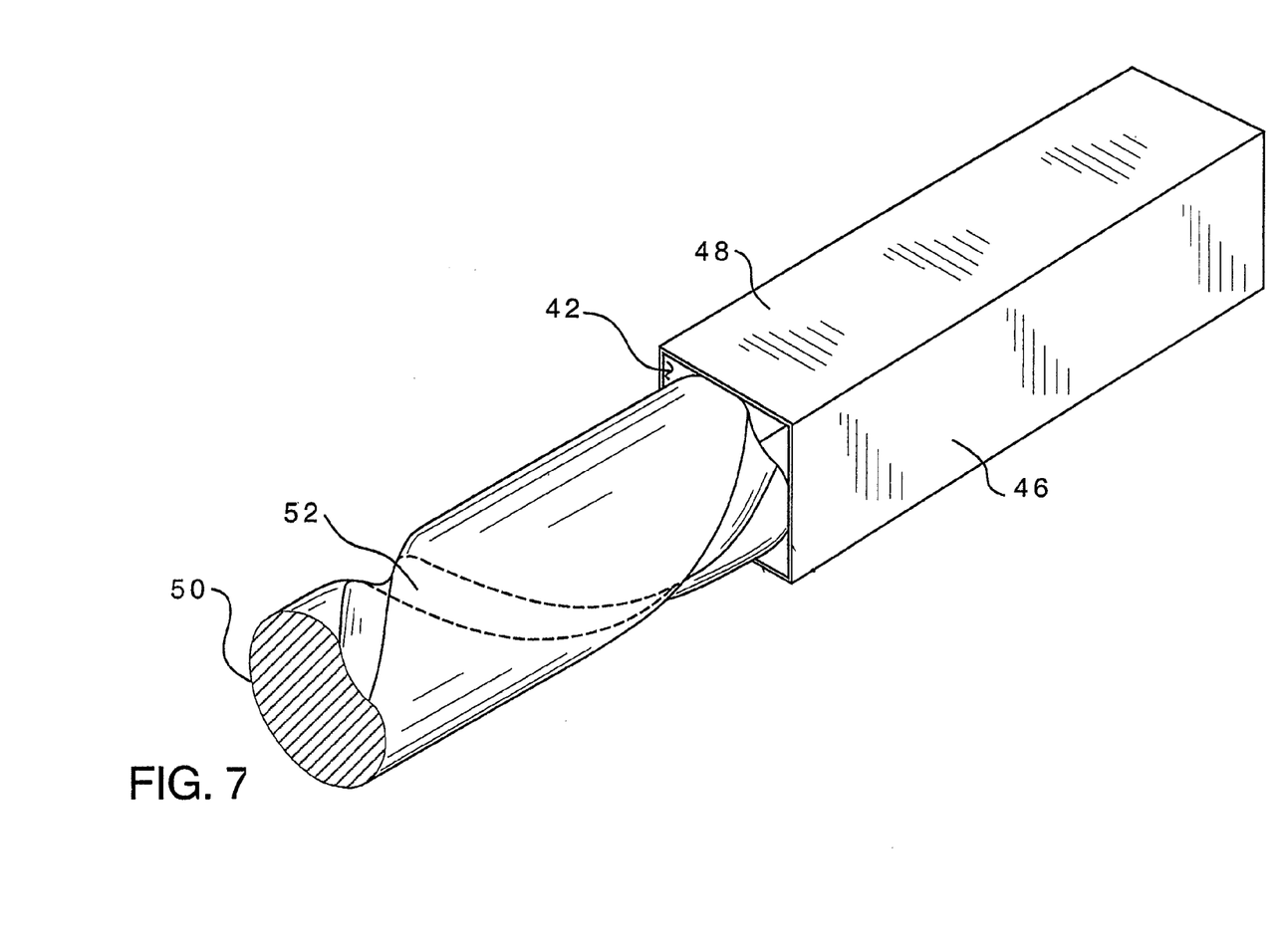
FIG. 7 is an isometric view of a tubular element with a single contact portion adjacent to a cell.
Figure 8:
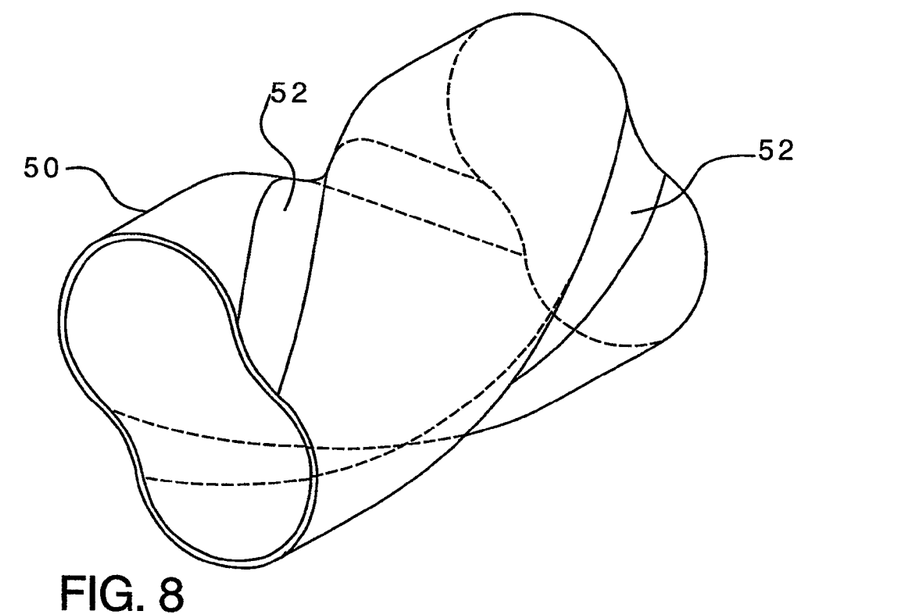
FIG. 8 is an isometric view of a tubular element with two fuel rod contact portions.
Figure 9:
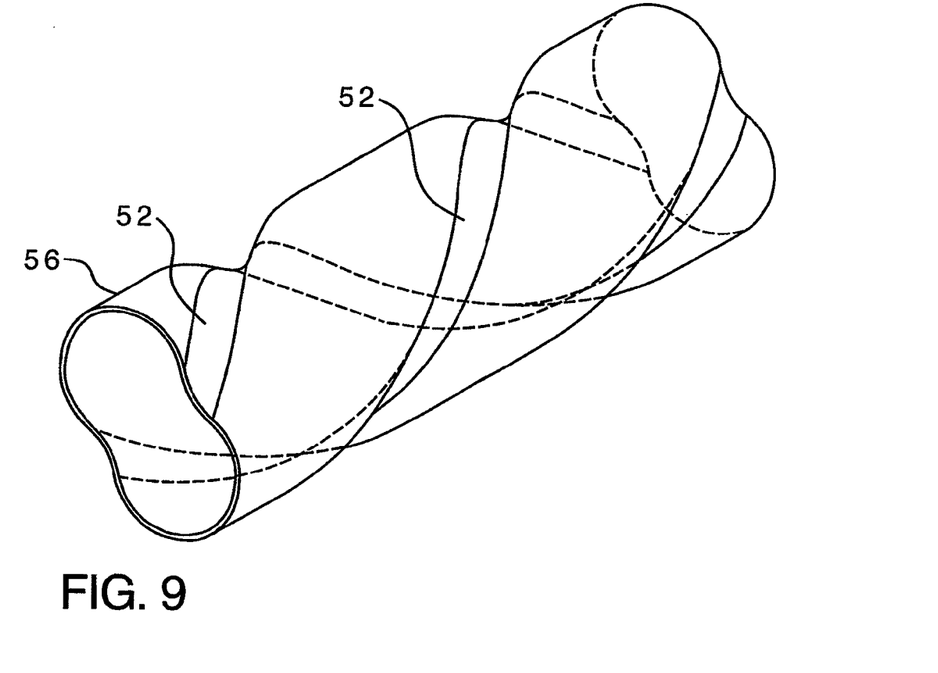
FIG. 9 is an alternate isometric view of a tubular element with two fuel rod contact portions.

The tubular member 50 may be constructed with any number of helical fuel rod contact portions 52 which may have any degree of pitch. For example, as shown in FIG. 7, a tubular member 50 has a single helical fuel rod contact portion 52 that extends 360 degrees about the tubular member 50. As shown in FIG. 8, a tubular member 50 has a two helical fuel rod contact portions 52 that each extend 180 degrees about the tubular member 50. As shown in FIG. 9, a tubular member 50 has a two helical fuel rod contact portions 52 that each extend 360 degrees about the tubular member 50. As noted above, FIG. 5 shows a tubular member 50 having a four helical fuel rod contact portions 52 that each extend 90 degrees about the tubular member 50. Preferably, the helical fuel rod contact portions 52 are spaced evenly about the tubular member 50, but this is not required.

These examples have used a number (N) of helical fuel rod contact portions 52 and an angular displacement (A) that equals 360 degrees or a multiple of 360 degrees. This configuration is especially adapted for use in a square cell 42A. That is, the cell contact portion 54 will only contact the cell wall 43 at the closest point on the cell wall 43. At other points, e.g., the corner of the cell 42A, the tubular member 50 greater diameter, that is the cell contact portion 54, will not contact a cell wall 43. Thus, as shown best in FIG. 6, where there are four evenly spaced, helical fuel rod contact portions 52 that each extend 90 degrees about the tubular member 50, there are four corresponding cell contact portions 54, each disposed between a helical fuel rod contact portions 52. To ensure the greatest amount of surface area contact between the tubular member 50 and the cell wall 43, the tubular member 50 is disposed with each helical fuel rod contact portion 52 generally aligned with a diagonal axis at the top side 47 of the cell and aligned with a different diagonal axis at the bottom side 49 of the cell. In this orientation, the cell contact portion 54 is aligned with a cell wall 43 closest point at the top side 47 and at the bottom side 49. A similar configuration may be made with cells 42 of any shape. That is, the number (N) of helical fuel rod contact portions 52 is preferably equal to the number of sides (S) to the cell 42, and the angular displacement (A) is preferably 360 degrees/S. Thus, the tubular member may be positioned with each helical fuel rod contact portion 52 generally aligned with an axis passing through the corner of the cell 42 at the top side 47 of the cell and aligned with a different axis passing through the corner of the cell 42 at the bottom side 49 of the cell. Thus, the cell contact portion 54 is aligned with the cell wall 43 closest point at the top side 47 and at the bottom side 49.

Figure 10:
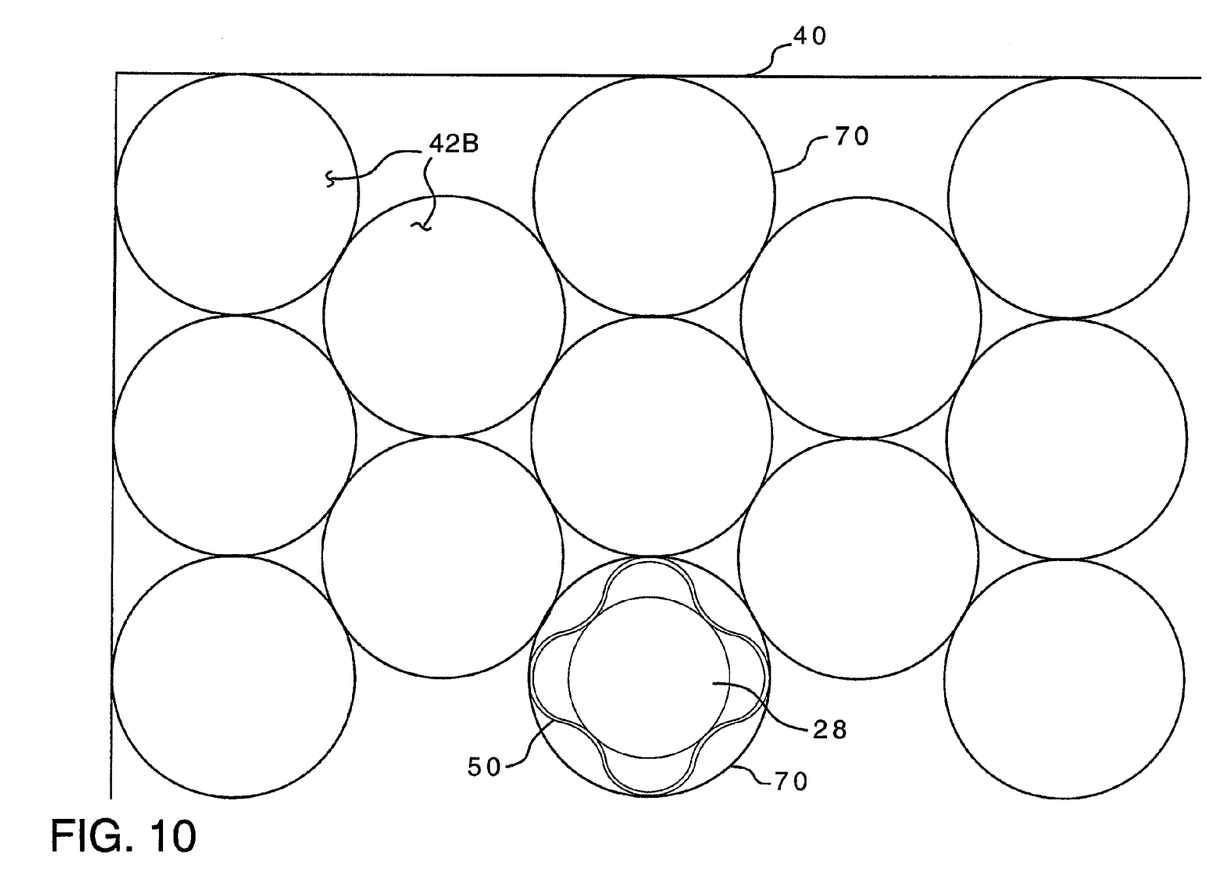
FIG. 10 is a top view of a portion of a frame assembly made from tubular frame members.
Figure 11:
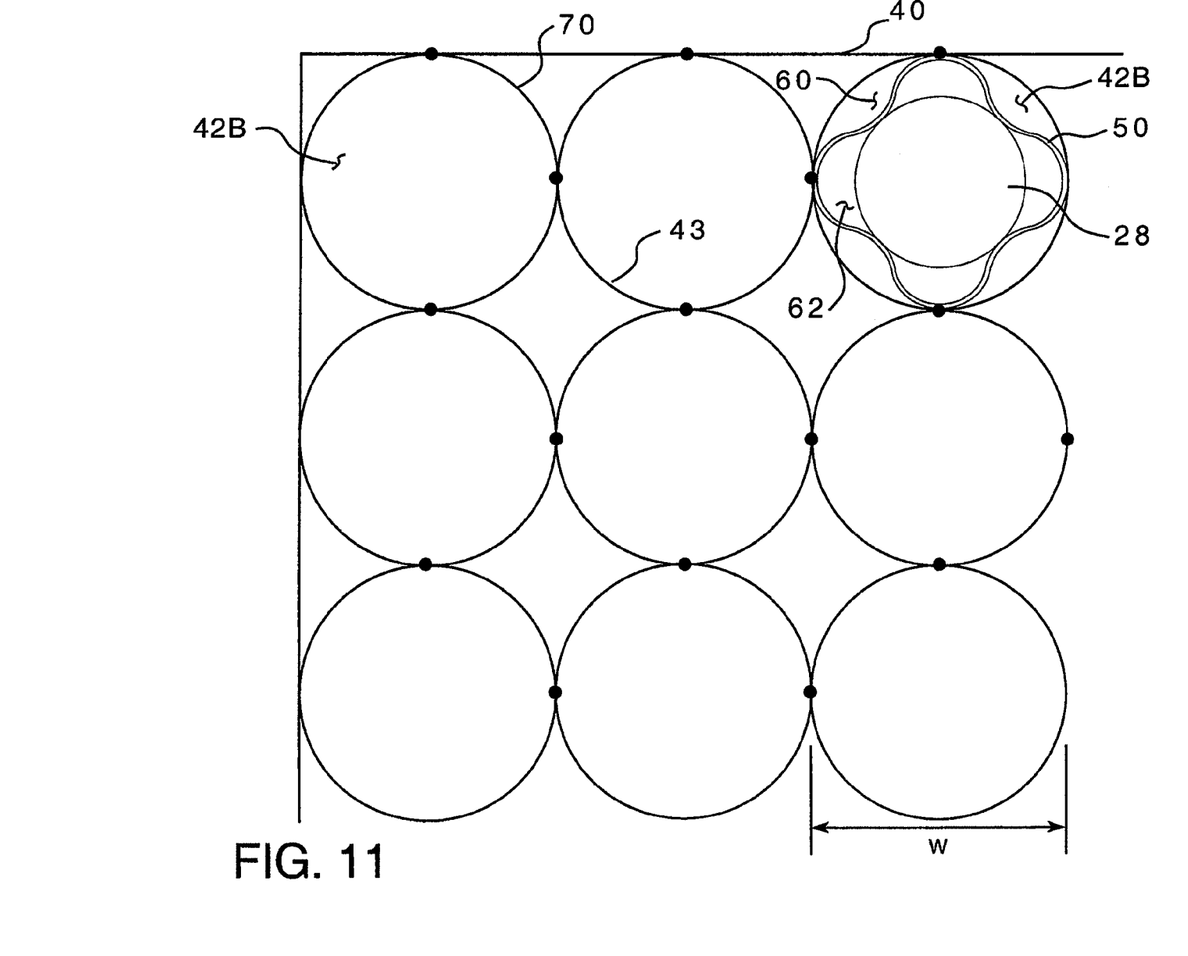
FIG. 11 is a top view of a portion of a frame assembly made from aligned tubular frame members.
Figure 12:
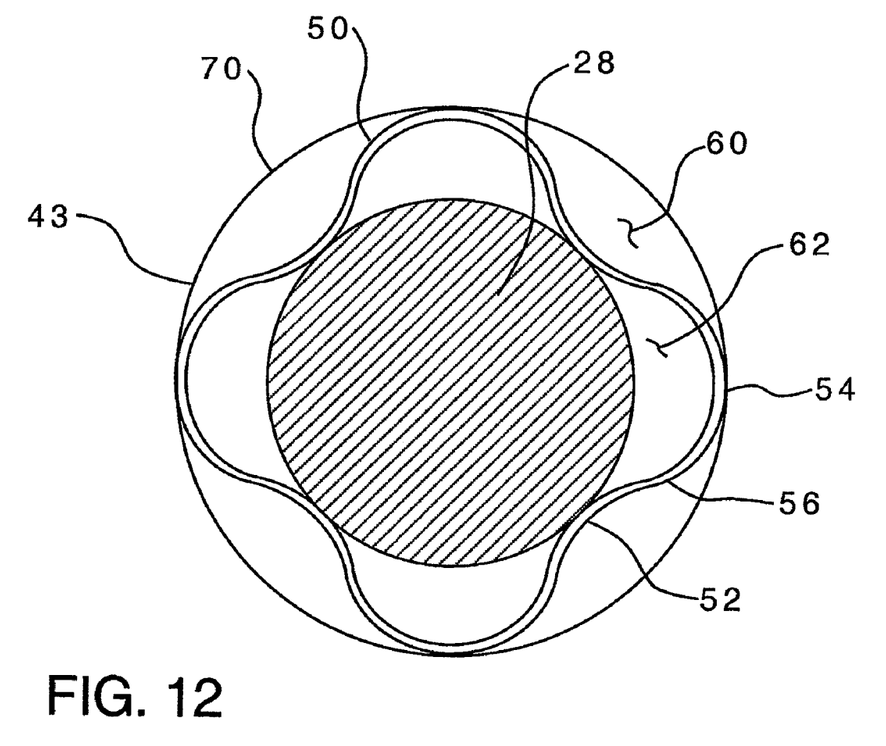
FIG. 12 is a detailed top view of a tubular member in a tubular frame member.

In another embodiment, the frame assembly 40 includes a plurality of cylindrical cells 42B defined by a plurality of connected tubular frame members 70. As shown in FIG. 10, the frame assembly 40 may have a plurality of densely packed tubular frame members 70, however, as shown in FIG. 11, a pattern of aligned tubular frame members 70 is preferred. That is, the tubular frame members 70 are coupled to each other at 90 degree intervals about the perimeter of each tubular frame member 70. The tubular member 50 is disposed within the cylindrical cells 42B. As shown in FIG. 12, the combination of the tubular member 50 and the cylindrical cell 42B again creates an inner passage 62 between the fuel rod 28 and the tubular member 50 and an outer passage 60 between the tubular member 50 and the tubular frame member 70. The cylindrical cell 42B of the tubular frame member 70 has the additional advantage that the entire cell contact portion 54 abuts the cell wall 43. That is, the diameter of the cylindrical cell 42B is the same as the cell width, which is also the same as the closest point, and, as such, the cell contact portion 54 will engage the cell wall 43 along the entire height of the cell wall 43. This is unlike a square cell 42A wherein the cell contact portion 54 does not contact the cell wall 43 at the corners.

Figure 13:
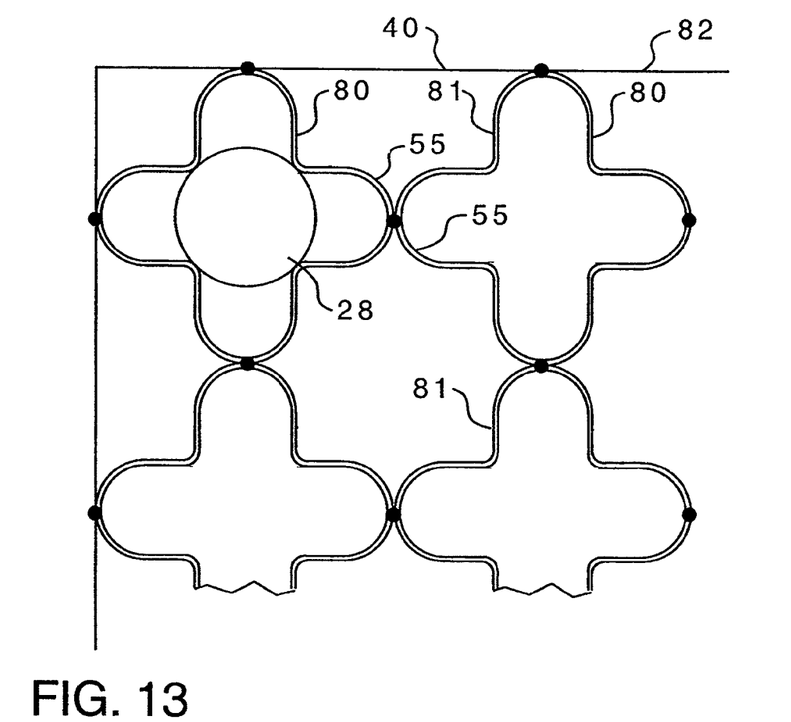
FIG. 13 is a detailed top view of a frame assembly made from helical frame members.

In another embodiment, shown in FIG. 13, the functions of the tubular member 50 and the tubular frame member 70 have been combined in a helical frame member 80. That is, the frame assembly 40 includes a plurality of helical frame members 81 disposed in a matrix pattern. The helical frame member 80, like the tubular member 50, includes at least one helical fuel rod contact portion 52, however, instead of a cell contact portion 54, the outer side of the helical frame member 80 is a contact portion 55 structured to be directly coupled to the contact portion 55 of an adjacent helical frame member 80. As with the tubular frame member 70 embodiment of the frame assembly 40, the helical frame members 80 are coupled to each other at 90 degree intervals about the perimeter of each helical frame member 80. Additionally, in this embodiment the frame assembly 40 preferably includes a plurality of outer straps 82 structured to extend about the perimeter of the plurality of helical frame members 81. The outer straps 82 are coupled to the contact portion 55 of the helical frame members 80 disposed at the outer edge of the plurality of helical frame members 81. A fuel rod 28 is disposed through at least one helical frame member 80.

Figure 14:
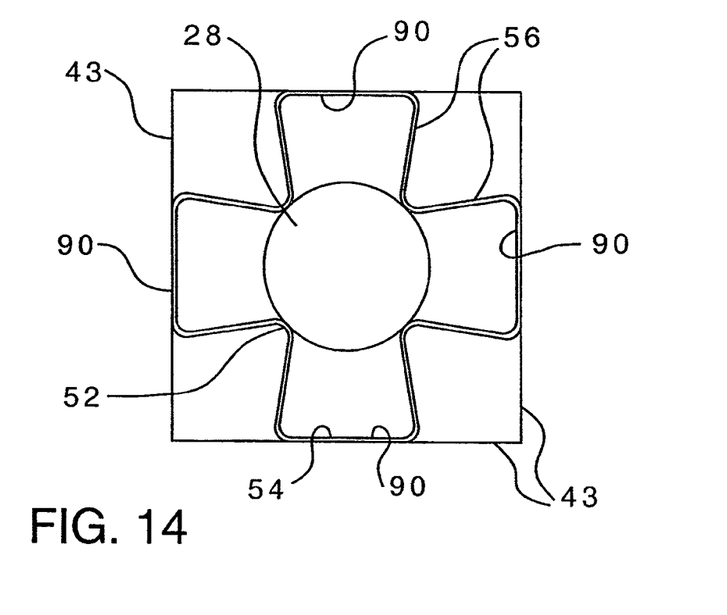
FIG. 14 is a detailed top view of a tubular member having platforms at the cell contact portions.
Figure 15:
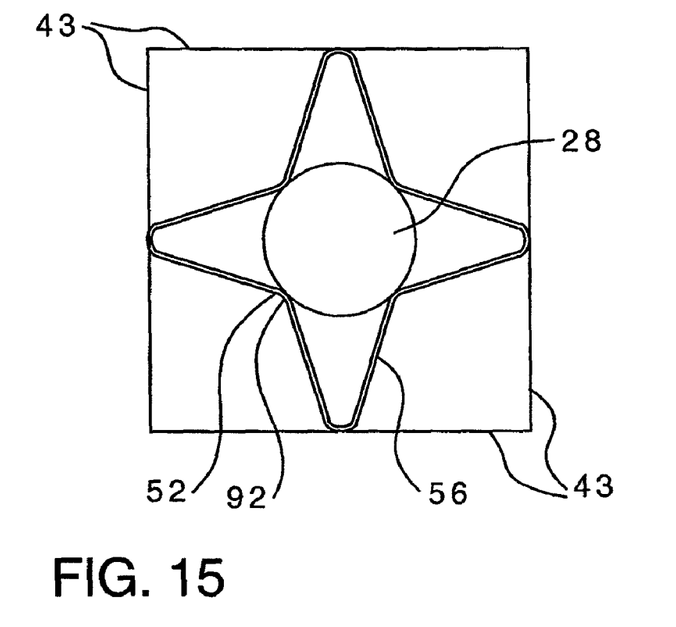
FIG. 15 is a detailed top view of a tubular member having platforms at the fuel rod contact portions.
Figure 16:
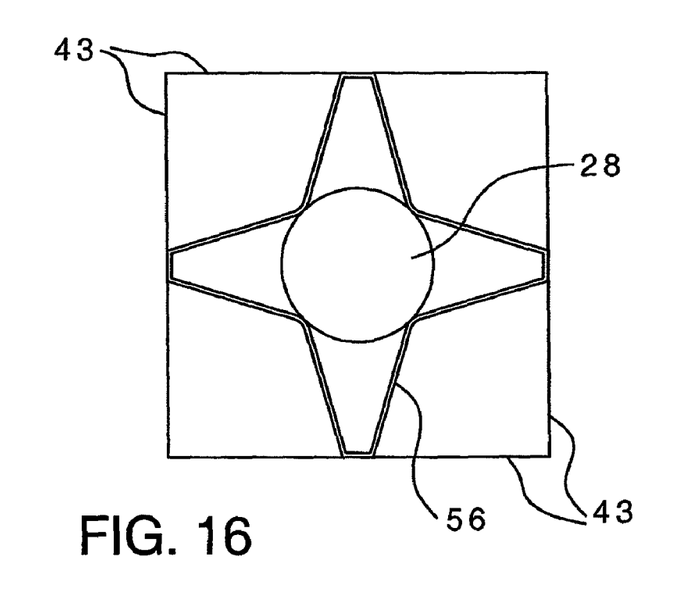
FIG. 16 is a detailed top view of a tubular member having platforms at the cell contact portion and the fuel rod contact portions, and with a flat transition portion.

As shown best in FIG. 12, as viewed as a cross-section, the tubular member 50 components, i.e., the helical fuel rod contact portion 52, the cell contact portion 54, and the transition portion 56, preferably, are shaped as smooth curves. This configuration gives the tubular member 50 a compressible, spring-like quality. However, as shown in FIG. 14, the cell contact portion 54 may include an extended planar length or platform 90. The platform 90 is structured to provide a greater surface area which engages the cell wall 43. The greater length of the platform 90 will necessitate the transition portion 56 having a sharp curve. Similarly, as shown in FIG. 15, the helical fuel rod contact portion 52 may include a concave platform 92 adapted to extend radially about the fuel rod 28. As before, greater length of the concave platform 92 will necessitate the transition portion 56 having a sharp curve. A tubular member 50 may also include both a platform 90 at the cell contact portion 54 and a concave platform 92 at the helical fuel rod contact portion 52. Finally, the tubular member 50 may also be constructed with a generally flat transition portion 56 with angled ends 94. As shown in FIG. 16, in this embodiment the transition portion 56 is generally planar in a cross-sectional top view. It is understood that, due to the helical nature of the fuel rod contact portion 52, the transition portion 56 is not flat in the direction of the height of the frame assembly 40.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A support grid for a nuclear fuel assembly, said nuclear fuel assembly structured to support a generally cylindrical fuel rod with an outer diameter, said support grid comprising:
a frame assembly having a plurality of outer straps and a plurality of helical frame members;
wherein each said helical frame member has a helical contact portion and at least one fluted helical fuel rod contact portion, said helical contact portion having a greater diameter than the diameter of the at least one helical fuel rod contact portion, the helical contact portion structured to contact one of an adjacent helical frame member or one said outer strap, said contact portion and said fuel rod contact portion joined by a transition portion, said at least one helical fuel rod contact portion diameter being generally equivalent to said fuel rod outer diameter such that, if a fuel rod was disposed in said helical frame member, said fuel rod outer diameter would engage said helical fuel rod contact portion;
wherein, if a fuel rod was disposed in said helical frame member, said at least one helical fuel rod contact portion defines an inner passage between the rod and the helical frame member, said inner passage having a helical shape;
each said helical frame members coupled to an adjacent helical frame member at a contact portion, said plurality of helical frame members forming a grid;
said plurality of outer straps disposed about the perimeter of said helical frame members; and
said plurality of outer straps being coupled to said contact portion of each helical frame member disposed immediately adjacent to an outer strap.

2. The support grid of claim 1 wherein said helical frame members have a wall with a uniform thickness.

3. The support grid of claim 1 wherein said helical frame members are coupled to each other at 90 degree intervals about the perimeter of each helical frame member.

4. The support grid of claim 1 wherein said at least one helical fuel rod contact portion extends 360 degrees about said helical frame member.

5. The support grid of claim 4 wherein said transition portion is a generally smooth curve.

6. The support grid of claim 1 wherein said at least one helical fuel rod contact portion includes two helical fuel rod contact portions.

7. The support grid of claim 6 wherein each said helical fuel rod contact portion extends 180 degrees about said helical frame member.

8. The support grid of claim 6 wherein each said helical fuel rod contact portion extends 90 degrees about said helical frame member.

9. The support grid of claim 8 wherein said transition portion is a generally smooth curve.

10. The support grid of claim 1 wherein said at least one helical fuel rod contact portion includes four helical fuel rod contact portions.

11. The support grid of claim 10 wherein each said helical fuel rod contact portion extends 90 degrees about said helical frame member.

12. The support grid of claim 11 wherein said transition portion is a generally smooth curve.

13. The support grid of claim 1 wherein said at least one helical fuel rod contact portion defines a helical outer passage.

14. The support grid of claim 1 wherein said helical frame member is a tubular member having at least one flute.

15. The support grid of claim 14 wherein said helical frame member is a tubular member having two flutes.

16. The support grid of claim 14 wherein said helical frame member is a tubular member having four flutes.

* * * * *